United States Patent

[11] 3,569,785

[72] Inventors: Robert C. Durbeck, Los Gatos; Patrick E. Mantley, San Jose, Calif.
[21] Appl. No.: 743,420
[22] Filed: July 9, 1968
[45] Patented: Mar. 9, 1971
[73] Assignee: International Business Machines Corporation, Armonk, N.Y.

[54] POWER SYSTEM PROTECTIVE RELAYING BY TIME-COORDINATED SAMPLING AND CALCULATION
7 Claims, 7 Drawing Figs.

[52] U.S. Cl. .................................... 317/27, 235/151.21, 235/151.31, 317/36, 324/57
[51] Int. Cl. ........................................ H02h 3/40
[50] Field of Search .......................... 317/36 (d), 11.1, 27; 235/151.21, 151.31; 324/28 (CB), 57 (Z)

[56] References Cited
UNITED STATES PATENTS
| | | | |
|---|---|---|---|
| 2,595,675 | 5/1952 | Jaynes | 324/57Z |
| 3,237,100 | 2/1966 | Chalfin et al. | 324/57Z |
| 3,340,434 | 9/1967 | Riebs | 317/36D |

Primary Examiner—Robert K. Schaefer
Assistant Examiner—William J. Smith
Attorneys—Hanifin and Clark and John L. Jackson ABSTRACT: A method of controlling the operation of a breaker in a transmission line by first monitoring the current and if the current exceeds a prescribed limit, measuring a sampling of the voltage on the line when the current is at zero and dividing this value by the maximum current on the line to obtain a first quantity which is added to a second quantity obtained by measuring a sampling of the voltage when the current is at its maximum value and dividing this voltage by the maximum current. The previous calculations will provide a measure of impedance since the voltage when the current is zero is equal to $V_m \sin \Phi$ while the voltage when the current is at maximum is equal to $V_m \cosine \Phi$ and impedance in a rectangular coordinate representation is: $z = R+jX = V_m \cosine \Phi/I_m + j(V_m \sin \Phi/I_m)$. This apparent impedance is then compared against relay characteristics which are implemented in a programmed general purpose computer and in the event the apparent impedance lies within the relay characteristic zone, the associated breaker is tripped.

INVENTORS
ROBERT C. DURBECK
PATRICK E. MANTEY

BY *John L Jackson*

ATTORNEY

POWER SYSTEM PROTECTIVE RELAYING BY TIME-COORDINATED SAMPLING AND CALCULATION

BACKGROUND OF INVENTION

1. Field of Invention

This invention relates to the control of the breakers in transmission lines in general, and more particularly, relates to a technique of determining apparent impedance followed by subsequent relay action without determining trigonometric functions of the sine and cosine of the relative phase between the voltage and the current.

2. Description of Prior Art

In the prior art the most widely used control for operating breakers is based on a measure of apparent impedance as seen by the relay. The relays are primarily electromechanical devices in which opposing torques are utilized and when the torque associated with impedance exceeds the biasing torque, the breaker is tripped. Each of the relays on a transmission line must be set by a maintenance man using relatively complex equipment.

The electromechanical type of relay has not been entirely satisfactory in the past in that it has been the cause of recent massive power failures. In one power failure a number of relays were inadvertently set to trip on a relatively low impedance and since the dispatcher did not know that his control strategy was approaching the threshold of the settings he could not take corrective action and the relays tripped and a surge of power was placed on other lines which in turn caused a cascading effect. In another instance, the relays again were incorrectly set such that they did not trip when the control strategy of the dispatcher reached a critical thermal limit and one transmission line sagged onto another again causing a cascading of breaker trips and a resultant surge of power causing further cascading.

For optimum control of faults on a transmission line, the setting of each of the relays must be known by the dispatcher so that he can regulate his control strategy in accordance with the settings and, additionally, it would be further desirable if the dispatcher could alter the settings of the relays. That is, under different conditions, the dispatcher might want the relays to trip differently to alleviate, for instance, the problems associated with a line exceeding its thermal limit.

Additionally, it would be desirable if the speed of action of the relays could be increased, since the electromechanical relays currently in use are relatively slow in that they measure an average or RMS value and, additionally, have inertia to overcome. Thus, the typical operating time of an electromechanical relay is on the order of several cycles.

Another problem associated with electromechanical relays is that of complexity in the event that a characteristic other than a circular characteristic is to be implemented. That is, with electromechanical relays a circular impedance zone is usually implemented since this is the least complicated characteristic and when the impedance falls within this circular zone, the breaker is tripped. One problem associated with the circular characteristic is that the impedance may rotate or move around during transient swings between generators and cause a breaker trip which should not have occurred since no fault has occurred. To alleviate this problem, a bias is usually placed on the electromechanical relay so that the circle zone is moved further up into the first quadrant. Also, to further alleviate false trips, often "blinders" are added to the circular impedance zone. The more refined pattern that the zone takes the more complex the relay is since additional torque coils must be added to the relay to define the more complicated impedance zones. Consequently, it is desirable not only to be able to implement any desired relay characteristic, but it is further desirable to implement these relay characteristics in a straightforward simple and foolproof manner such that when the apparent impedance falls within the danger zone, relay action will immediately take place.

Solid State analogue equipment also exists for relaying based on a measurement of apparent impedance and simple boundaries for relay action are implemented by analogue comparisons. Both these devices and the electromechanical relays suffer from a lack of flexibility and their relay characteristics cannot be changed remotely.

SUMMARY OF INVENTION

Briefly, there is provided a control technique for use in controlling the tripping of breakers in transmission lines when the apparent impedance falls within a precise zone. In the present technique the line current is first measured to determine whether it exceeds a prescribed limit. In the event that the current does not exceed the prescribed limit, no further control action is taken, but the current value is stored by writing over the previous value in memory. Similarly, the voltage on the line is measured by sampling at the time the current is at zero, which provides a measure of $V_m \sin\Phi$ and this quantity is stored and the voltage is measured by sampling when the current is at its maximum value which gives a measure of $V_m \cos\Phi$, and this quantity is stored. Both of these values are also written over the previously measured values. In the event the current exceeds the prescribed limit, further control action must be taken. To accomplish further control, the quantities representing $V_m \sin\Phi$ and $V_m \cos\Phi$ are each divided by the maximum current and the result added, which provides a measure of apparent impedance without requiring the conventional time measure between current and voltage to obtain the relative phase angle between current and voltage followed by the determination of the sine and cosine of the phase angle. The apparent impedance is then compared with the relay characteristics in a programmed general purpose computer to determine whether the apparent impedance falls within the relay characteristics. In the event that the impedence falls within the relay characteristic, the breaker is tripped.

DESCRIPTION OF THE PREFERRED EMBODIMENT

Figure 1:
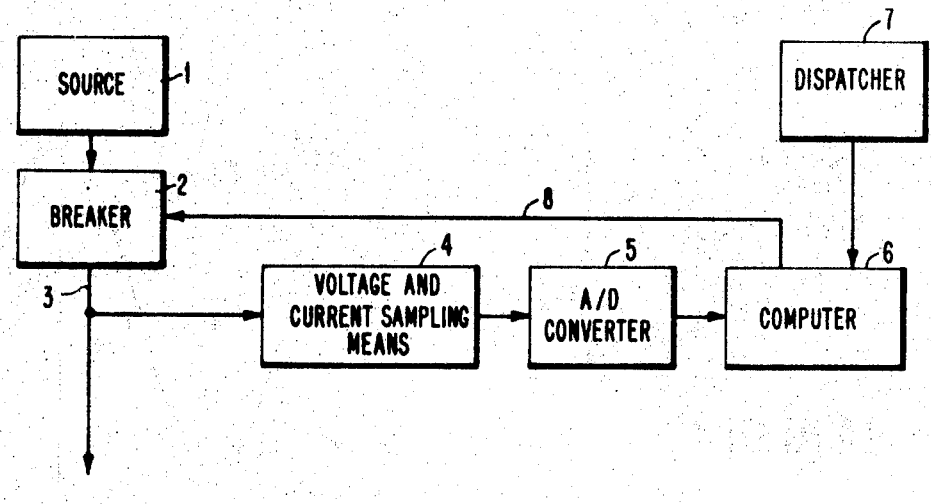
FIG. 1 is an overall block diagram illustrative of a transmission line and breaker along with the control circuitry for activating the breaker in the event that the impedance on the portion of the line with which the breaker is associated falls within a prescribed relay characteristic set by the dispatcher.

Refer first to FIG. 1 in which is shown a source 1 which may be the power source such as the generator station, or may be a transmission line. The source is connected through a breaker 2 to a transmission line 3. Connected to the transmission line 3 is a voltage and current sampling means 4 which provides measures of maximum current, voltage when the current is at zero and voltage when the current is at its maximum value, to the analogue to digital converter 5 which in turn provides a digital representation of these quantities to the computer 6. In the preferred embodiment hereinafter described, in the computer 6, the relay characteristic is implemented, the apparent impedance calculated and a comparison of the two made to determine if the impedance falls within the characteristic. A dispatching station 7 communicates with the computer 6 and provides relay characteristics which are to be implemented. The computer 6 is connected along line 8 to the breaker 2 such that the breaker 2 can be operated in the event that, as hereinafter described, the impedance of the line 3 falls within the relay characteristics set by dispatching station 7.

While in FIG. 1 there is shown a single transmission line and breaker and a single relay characteristic implementing and comparison means 6, this was done for simplicity and it should be understood that a number of transmission lines will be associated with a single programmed computer which effects control over the breakers associated with each of the transmission lines.

In the normal operation of a relay in a transmission line, the relay operates as previously described on the apparent impedance of its associated line and, if the apparent impedance falls within a preselected zone, which is often circular, the relay will cause the breaker to open. Present electromechanical relays convert RMS voltage and current measurements into corresponding torques which in conjunction with bias torques yield boundaries for relay action. Solid state analogue equipment also exists for relaying based on impedance measurements and simple boundaries for relay action are implemented by analogue comparisons. Complicated characteristics are achieved as previously described by use of multiple relays or blinders. The shortcomings of all of these techniques are that they lack flexibility and are difficult to change as far as their characteristics from a remote location.

In attempting to overcome the problem of lack of flexibility, applicants decided that since a computer could economically be made available at each major substation, the computer could monitor the impedance of each of the relays and, provided the impedance of the line fell within the relay characteristic, the relay could be tripped. However, the problem of calculating impedance was not easily overcome. The first approach taken was to measure peak voltage and peak current, which is relatively straightforward, and then determine the relative phase. Basically, the approach involved taking the time when the voltage crossed zero and the time that the current crossed zero and converting this time to an angle. This angle was then, by means of hardware, converted into the sine and cosine of the angle and the impedance obtained in accordance with the following equation:

$$Z = R + j_x = V_m \cosine \Phi/I_m + jV_m \sin\Phi/I_m$$

The above technique was relatively complicated in that while it was relatively simple to detect when the voltage crossed zero and when the current crossed zero, a timer was required and a conversion of the measured time to an angle had to be made. Also, a hardware device for providing a trigonometric function (sin, cos $\Phi$) was necessary. The need for this relatively complex hardware at each of the substations made this method of calculating apparent impedance impractical.

Figure 2:
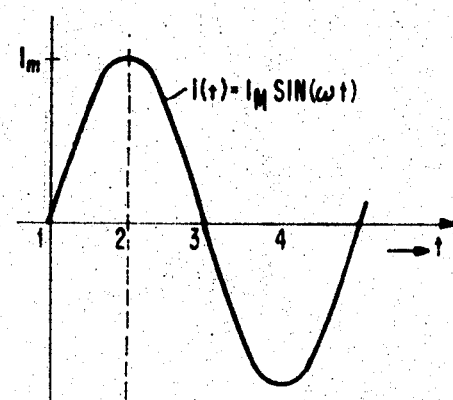
FIG. 2 is a waveform illustrative of the novel method of obtaining quantities in the subject invention which are used for a direct determination of impedance.

Applicants overcame this problem by a simple technique which is graphically illustrated in FIG. 2. In FIG. 2 the current is plotted as a function of time in the upper plot ($I = I_m \sin \omega t$) and the voltage is plotted as a function of time ($V = V_m \sin \omega t+\Phi$ be seen that when the current passes through zero, the voltage at that time is equal to $V_m \sin \Phi$ while when the current is at its maximum the voltage is equal to $V_m \cos \Phi$. Thus, if a measure of the voltage is taken when the current is at its maximum and zero values and these measurements stored and the maximum current obtained, the impedance that the relay sees can be determined directly. That is, since $Z=R+j_x=V_m \cos \Phi/I_m + jV_m \sin \Phi/I_m$, all of the quantities required to determine impedance are at hand. No hardware for determining the angle or the trigonometric function of the angle, i.e., sine-cosine, is required. Instead these values can be taken directly. Thus, R and X can be determined directly without the use of trigonometric functions. The value obtained when the current goes through zero is $\pm V_m \sin \Phi$ with the sign being positive when the current is going negative and the sign being negative when the current is going positive. If the voltage is again sampled one-fourth of a cycle later, ($\pi/2$), the current is at that time at its maximum and the quantities $\pm V_m \cos \Phi$ and $\pm I_m$ are obtained with the same sign consideration as above. If we let $r_1 = V_m \sin \Phi$; $r_2 = \pm V_m \cos \Phi$; $r_3 = \pm I_m$, then $$Z = R + j_x = \frac{r_2}{r_3} + j\frac{r_1}{r_3}$$

which can be calculated by one fixed point inversion ($1/r_3$) and two fixed point multiplications or by two fixed point divisions as will later become more apparent. Thus, the impedance can readily be calculated based solely on the voltage measurements when the current is passing through zero and its maximum values and a measure of the maximum current. With the availability of the impedance of the line in rectangular coordinates, a wide range of relaying characteristics can be digitally implemented as will later be described and can again be readily modified as new conditions arise.

Figure 3:
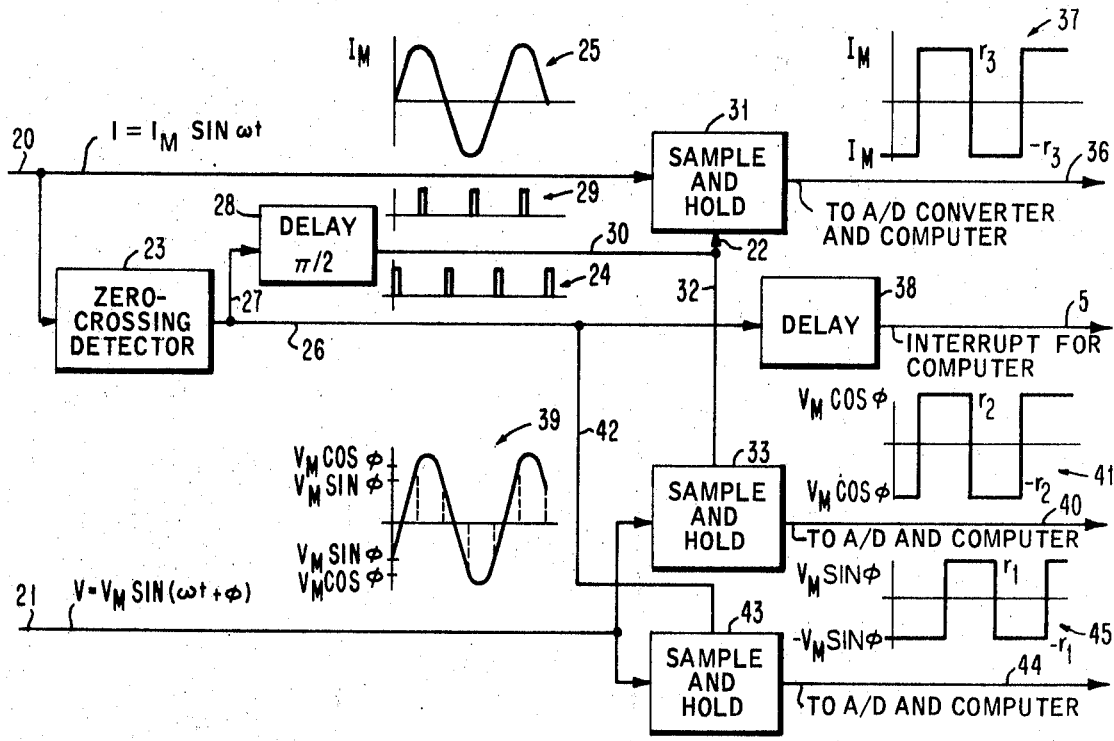
FIG. 3 is a block diagram along with associated waveforms of a device utilized to obtain the quantities designated in FIG. 2 whereby a direct reading of impedance can be obtained.

In FIG. 3 is shown a block diagram of voltage and current sampling hardware that can be utilized to provide a measure of the values $V_m \cos \Phi$ and $V_m \sin\Phi$ directly. While in FIG. 3 a block diagram of hardware is shown, it should be understood that the sampling could be likewise done directly by a computer.

In FIG. 3 the current waveform defined by $I = I_m \sin (\omega t)$ is applied along line 20 from the transmission line while the voltage waveform defined by the equation $V = V_m \sin (\omega t+\Phi)$ is applied along line 21. The current waveform on line 20 is applied to a conventional sample and hold circuit which is operative upon receiving a signal along line 22 to hold the value of the current which at that time is on line 20. The waveform on line 20 is also fed into a zero crossing detector 23 which functions to sense the time that the value of the current is equal to zero. Each time that the current waveform passes through zero, a pulse is output from the zero crossing detector 23. These pulses represented by the plot 24 are applied to lines 26 and 27. The pulses from the zero crossing detector 23 which appear on line 27 are input to a delay unit 28 which functions to delay the pulses by one-fourth cycle ($\pi/2$). These delay pulses represented by the plot 29 are applied along line 30 to the sample and hold device 31 and along line 32 to the sample and hold device 33. From a consideration of plots 25, 29 and 24, it can be seen that the delay pulses represented by plot 29 occur when the current is at its maximum value, while the nondelay pulses 24 occur when the current passes through zero.

Since the delayed pulses appearing on line 30 are applied along line 22 to the sample and hold unit 31, the sample and hold unit 31 will sample and hold the maximum current values. The output of sample and hold unit 31 is applied along line 36 to the A/D converter of the computer. The waveform appearing on line 36 is illustrated by the plot 37. From a consideration of the plot 37, it can be seen that the output on line 36 moves between the minus maximum current value and the plus maximum current value which correspond as per the previous discussion with $-r_3$ and $+r_3$ respectively. The non-delay pulses appearing on line 26 are again delayed by means of a delay unit 38 and after the delay has timed out the computer will be interrupted as will later be described. The delay 38 is provided to prevent the computer from being interrupted prior to all the samples being completed and stored in memory.

The delay pulsed on line 30 which are applied along line 32 to the sample and hold unit 33, as previously described, occur when the current is at its maximum values. Thus, they activate the sample and hold unit 33 whenever the current is at its maximum value which, as previously discussed, will provide a direct measurement of $V_m \cos \Phi$ both positive and negative. The output from the sample and hold unit 33 is applied along line 40 and is illustrated in plot 41. From a consideration of plot 41, it can be seen that the output on line 40 moves from $-V_m \cos \Phi$ to $+V_m \cos \Phi$ each time that a pulse appears on line 32. These values correspond as previously described with $-r_2$ and $+r_2$ respectively.

The nondelay pulses appearing on line 26 are also applied along line 42 to the sample and hold unit 43 which receives the voltage waveform $V_m \sin \omega t + \Phi$. Thus, the sample and hold unit 43 will sample and hold the potential appearing on line 21 when the current on line 20 passes through zero. As previously described, this potential is equal to $V_m \sin \Phi$. Thus, the output on line 44 from the sample and hold unit 43, will move between $-V_m \sin \Phi$ and $+V_m \sin \Phi$ as illustrated in plot 45. These values correspond to $-r_1$ and $+R_1$ respectively.

Figure 4:
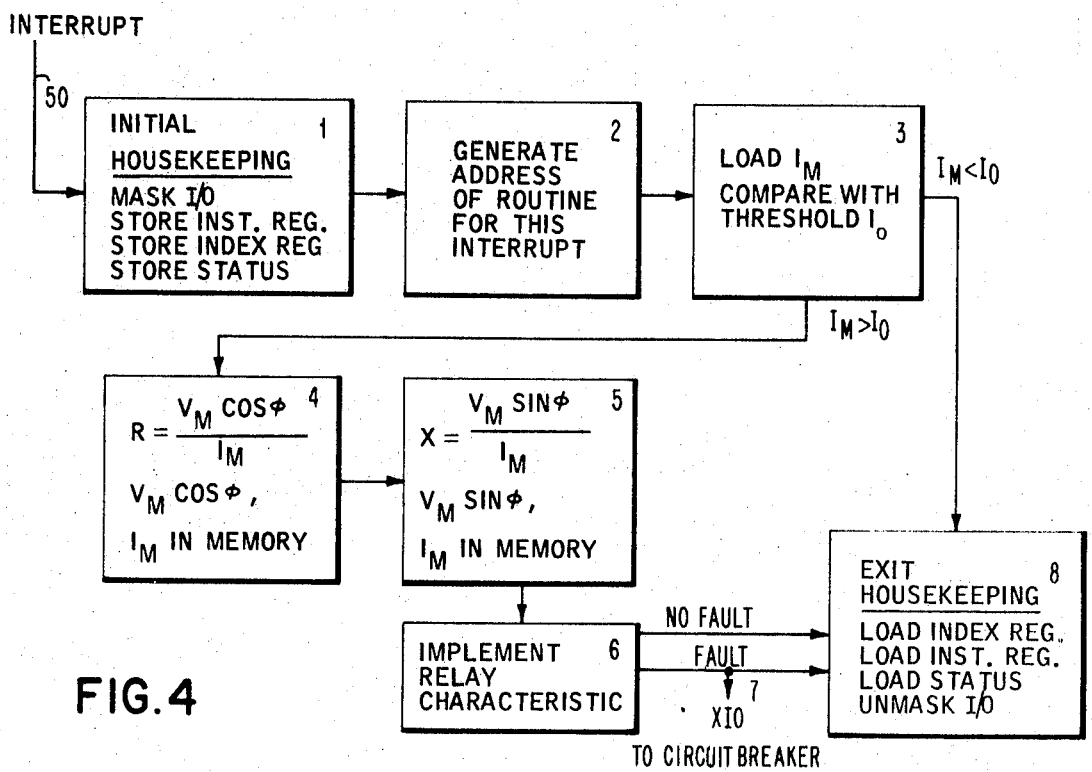
FIG. 4 is a generalized flow chart of the actions taken on an interrupt basis by a computer to accomplish control in accordance with the apparent impedance and the relay characteristic implemented.

Refer next to FIG. 4 which is a generalized block diagram of the control steps which would occur if a computer in a substation were interrupted by means of, for instance, a signal on line 50 from the delay unit 38 of FIG. 3. An interrupt action is described here since the usual computer will be occupied the majority of the time either controlling a number of other lines or will be occupied in doing other tasks. The interrupt procedure hereinafter described is that of an IBM*

* Trademark International Business Machines Corporation 1800 System. When the interrupt occurs, as indicted in block 1, the initial housekeeping is performed including the masking of the I/O, storing the contents of the instruction register, storing the contents of the index register and storing of status. When this has been done an exit is made to block 2 wherein the address of the routine for the interrupt is generated and when this is accomplished exit is made to block 3. In block 3 the value of the maximum current $I_m$ is compared with the threshold current $I_o$ and in the event that $I_m$ is less than $I_o$, exit is made to block 8 where the exit housekeeping is performed as indicated. In the event that $I_m$ is greater than $I_o$, exit is made to block 4 where $r = V_m \cos \Phi/I_m$ is calculated and then exit is made to block 5 where $X = V_m \sin \Phi/I_m$ is calculated. Since as indicated, $I_m$ is in memory, these values are then stored and as indicated in block 6 the relay characteristic is implemented and the impedance calculated in block 5 is compared with the relay characteristics in block 6 and in the event that no fault is detected, exit to the housekeeping block 8 is made and if there is a fault the circuit breaker is tripped. The above general flow chart will be described in detail in conjunction with FIG. 6 which provides a step-by-step move through this flow chart.

Figure 5A:
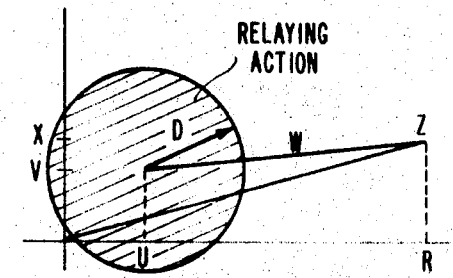
FIG. 5a is a diagram of a circular impedance zone.
Figure 5B:
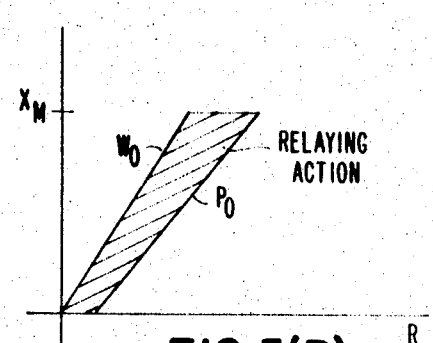
FIG. 5b is a diagram of a line impedance zone.
Figure 6:
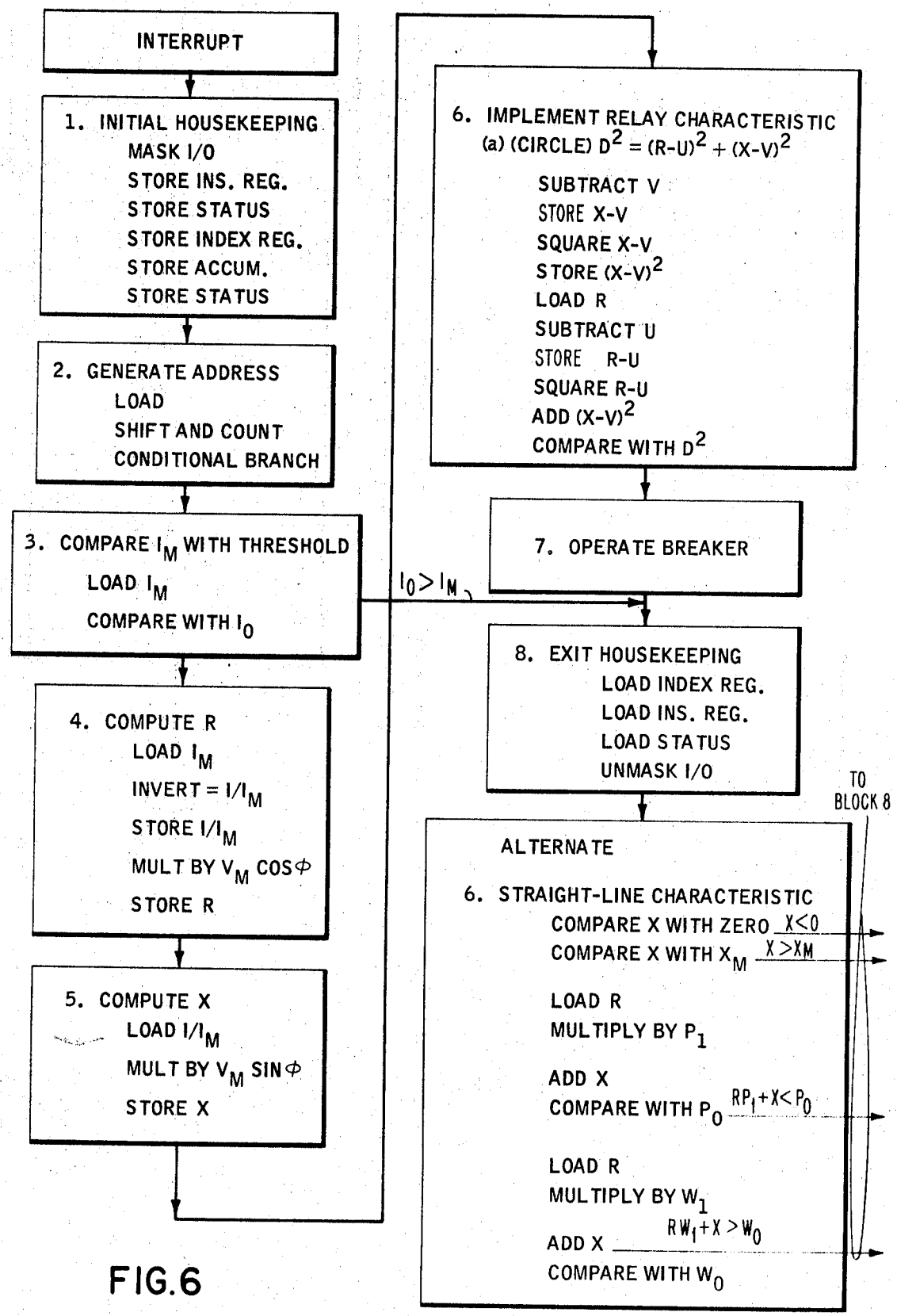
FIG. 6 is a detailed flow chart of the actions to be taken to effect control based on the impedance of the line as considered in conjunction with both a circular impedance pattern and a linear or line impedance pattern.

To facilitate an understanding of the detailed flow chart of FIG. 6 reference should be made to FIGS. 5a and 5b which will facilitate an understanding of the steps taken in blocks 4, 5 and 6 which result in a comparison of the relay characteristics with the calculated apparent impedance. In FIG. 5a there is shown a circular area indicated as "relaying action." If the apparent impedance falls within this zone, the circuit breaker should operate. From a consideration of FIG. 5a it can be seen that the center of the circle has been offset from the zero coordinates such that the circle lies primarily in the first quadrant. The offset in the X-direction is by an amount equal to V and in the R-direction by an amount equal to U. The impedance is represented by Z and, consequently, by computation of W, a straightforward comparison can be made to determine if W is greater than or less than D. If W is greater than D, no relaying action should take place, while if W is less than D, relaying action should occur. That is, it can be seen that $W^2 = (R-U)^2 + (X-V)^2$, and then $W^2 \gtreqless D^2$.

In FIG. 5b is shown a straight line relay characteristic which approaches the ideal relay characteristic which should be implemented but which heretofore has been difficult to obtain since the only way to accomplish it has been through the use of blinders, added relays etc.

In FIG. 5b the boundaries of the relay characteristic are defined by the line $P_0 = P_1 X + R$; the line $W_0 = W_1 X + R$; the R-axis and $X_m$. If the apparent impedance falls within this zone, relay action must take place. If it falls anywhere outside of this zone no action is taken. The implementation of this relay characteristic and comparison of its boundaries with the apparent impedance as represented in coordinate form will be considered in detail in conjunction with FIG. 6.

In FIG. 6 is shown a detailed listing of the steps which are taken to implement the subject control technique by means of an interrupt procedure on a programmed general purpose computer. Upon receiving an interrupt along line 50 the interrupt procedure will be entered into. In this procedure as indicated in Block 1, the initial housekeeping is taken care of which includes the masking of the I/O which prevents any more interrupts from being accepted by the processor. The contents of the instruction register, the index register, the accumulator and the quotient register along with the status, are stored and then in block 2 the address of the subroutine which is to be processed is generated. Here the address associated with the particular interrupt is loaded into the accumulator and shifted and the number of shifts required for a one bit to come out of the accumulator is counted and this number then controls the branch. Depending upon which shift resulted in a 1, a particular address will be branched to and the instruction register will be loaded with the proper instruction to initiate the subroutine. Exit is then made to block 3 and $I_m$ is loaded into the accumulator and a compare made with $I_o$. As part of the compare instruction the address of $I_o$ which had previously been stored in memory is obtained such that $I_o$ can be compared with $I_m$. If $I_o$ is greater than $I_m$, exit is made to block 8 where the exit housekeeping is accomplished such that the computer can enter into another routine. If $I_o$ is less than $I_m$, block 4 is entered into. In this block $I_m$ is first loaded into the accumulator and it is then inverted and $I_m$ is then stored into a particular address for temporary storage. Next, the contents of the accumulator which holds $1/I_m$ are multiplied by $V_m \cos \Phi$, which equals R, and R is then stored into a temporary address specified by the subroutine. Block 5 is then entered into and $1/I_m$ which had been temporarily stored is then brought into the accumulator and multiplied by $V_m \sin \Phi$ which yields X and X is then stored. Exit is then made to block 6 where V is subtracted from the contents of the accumulator (X) to yield the quantity $X - V$ which is then stored into a particular address in memory for temporary storage. The contents of the accumulator, $X - V$ are then squared and stored in a temporary location in memory and R is loaded into the accumulator and U is subtracted from it. $R - U$ is then stored and $R - U$ is squared and then added to $(X - V)^2$ and this quantity compared with $D^2$. In the event that the contents of the accumulator are greater than $D^2$, no action is taken. In the event that $D^2$ is greater than the quantity in the accumulator, the circuit breaker will be tripped as indicated in block 7.

Exit is then made again to the exit housekeeping block 8 where the contents of the various registers are reloaded and the I/O is unmasked such that additional interrupts can be accepted.

As indicated in FIG. 6, an alternate relay characteristic is shown. This block contains the steps which will be taken to implement the relay characteristic illustrated in FIG. 5b. Here again, X will be in the accumulator and X is compared with zero and if X is less than zero exit is then made to block 8 to the exit housekeeping and if not, X is then compared with $X_m$, and in the event that X is greater than $X_m$, exit is again to the exit housekeeping block 8. In the event that X is less than $X_m$, R is loaded into the accumulator and multiplied by $P_1$ and X is added into it and this quantity is then compared with $P_o$ and if this quantity is less than $P_o$, exit is then made to block 8 while if this quantity is greater than $P_o$, R is loaded into the accumulator and multiplied by $W_1$ and X is added into it and this quantity compared with $W_o$ and in the event that this quantity is greater than $W_o$, exit is made to the exit housekeeping block 8 and in the event that the quantity is less than $W_o$, the breaker is tripped.

In summary, there has been provided a relaying control system wherein the apparent impedance of a transmission line is determined without resort to calculations of trigonometric functions and this impedance is then compared in a straightforward manner to specified relay characteristics such that control action can be taken in the event that the apparent impedance falls within the predetermined danger impedance zone. In this technique no mechanism is required for the determination of the time that the zero crossings of the current and voltage differ along with the consequent conversion of this time to phase angle and subsequent conversion of the phase angle to sine and cosine values for the determination of impedance. Instead, in this technique direct readings of the voltage at the time the current crosses through zero and the voltage when the current is maximum are utilized to determine the apparent impedance. Through use of this technique the central dispatcher can alter the relay characteristic to conform with his particular control strategy and implement relay characteristics which heretofore have not been economically feasible to implement.

While the invention has been particularly shown and described with reference to a preferred embodiment thereof, it will be understood by those skilled in the art that various changes in the form and details may be made therein without departing from the spirit and scope of the invention.

We claim:

1. A method of controlling the operation of breakers in a transmission line comprising the steps of:
    sampling measurement of the maximum current on said line at least once each cycle;
    sampling measurements of the voltage on said line for each said breaker at predetermined instances during each cycle;
    interrupting a computer after a set of said sampling measurements have been made for a breaker to supply said set of measurements thereto;
    comparing, by said computer, said supplied maximum current measurement to a predetermined level;
    calculating, by said computer from said supplied measurements, the apparent impedance seen by each of said breakers, said calculation occurring in response to said current comparison step indicating that said maximum current exceeds said predetermined level;
    implementing desired relay characteristics for each of said breakers in said computer;
    comparing, by said computer, the relay characteristics of each of said breakers with its associated apparent impedance; and
    opening any of said breakers having an associated apparent impedance which said characteristics comparison step indicates falls within its associated relay characteristics.

2. The method of claim 1 wherein said voltage sampling step additionally comprises: sampling at such predetermined instances during each cycle that the sampled measurements are of the quantities $V_m \cos \Phi$ and $V_m \sin \Phi$.

3. The method of claim 2 wherein said characteristics comparison step comprises: sequentially comparing, by said computer, each of the boundaries of each of said relay characteristics with its associated impedance and upon said comparison indicating that said impedance falls outside of any of said associated boundaries, taking no breaker action.

4. The method of claim 1 wherein said voltage sampling step additionally comprises:
    sampling measurement, for each of said breakers, of the voltage on said line when the current is at its maximum value, thereby measuring the quantity $V_m \cos \Phi$, and of the voltage on said line when the current is zero, thereby measuring the quantity $V_m \cos \Phi$.

5. The method of claim 4 wherein said characteristics comparison step comprises:
    sequentially comparing, by said computer, each of the boundaries of each of said relay characteristics with its associated impedance and upon said comparison indicating that said impedance falls outside of any of said associated boundaries, taking no breaker action.

6. The method of claim 5 wherein said calculation step additionally comprises:
    calculating said apparent impedance by dividing each of said supplied quantities $V_m \cos \Phi$ and $V_m \sin \Phi$ by said maximum current.

7. The method of claim 6 wherein said interruption step additionally comprises:
    the quantities $V_m \cos \Phi$, $V_m \sin \Phi$ for each of said breakers and the maximum current measurement in said computer such that subsequent quantities are written over previous quantities so that the last measured quantities only are available.